(12) United States Patent
Harada

(10) Patent No.: US 11,989,616 B2
(45) Date of Patent: May 21, 2024

(54) READING DEVICE

(71) Applicant: TOSHIBA TEC KABUSHIKI KAISHA, Tokyo (JP)

(72) Inventor: Shintaro Harada, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/983,133

(22) Filed: Nov. 8, 2022

(65) Prior Publication Data

US 2023/0068925 A1 Mar. 2, 2023

Related U.S. Application Data

(63) Continuation of application No. PCT/JP2021/029304, filed on Aug. 6, 2021.

(30) Foreign Application Priority Data

Sep. 25, 2020 (JP) ................. 2020-160591

(51) Int. Cl.
 G06K 7/10 (2006.01)
(52) U.S. Cl.
 CPC ..... G06K 7/10732 (2013.01); G06K 7/10782 (2013.01); G06K 7/10831 (2013.01)
(58) Field of Classification Search
 None
 See application file for complete search history.

(56) References Cited

U.S. PATENT DOCUMENTS

| 2009/0140051 A1* | 6/2009 | Kwan | G06K 7/10732 |
| | | | 235/462.42 |
| 2013/0001312 A1* | 1/2013 | Kearney | G06K 7/10564 |
| | | | 235/470 |
| 2019/0057232 A1* | 2/2019 | Ren | G06K 7/10732 |

FOREIGN PATENT DOCUMENTS

| JP | 2005-294631 A | 10/2005 |
| JP | 2014-130459 A | 7/2014 |

OTHER PUBLICATIONS

English Translation of International Search Report dated Mar. 31, 2022, mailed in counterpart International Application No. PCT/JP2021/029304, 2 pages.

* cited by examiner

*Primary Examiner* — Kristy A Haupt
(74) *Attorney, Agent, or Firm* — Kim & Stewart LLP

(57) ABSTRACT

A reading device provided to obtain information specifying a product, the device including a housing, an imaging unit, and an illumination unit. The housing includes a transparent reading window. The imaging unit is built in the housing and captures an image through the reading window. The illumination unit illuminates an imaging target of the imaging unit by performing surface emission of light toward the outside of the housing. The illumination unit is disposed outside an edge of the reading window and is inclined with respect to the reading window so as to protrude more with respect to the reading window toward a side farther from the reading window.

4 Claims, 6 Drawing Sheets

READING DEVICE

CROSS-REFERENCE TO RELATED APPLICATIONS

This application is a continuation application of International Application No. PCT/JP2021/029304, filed Aug. 6, 2021, which designates the United States, and which claims the benefit of priority from Japanese Patent Application No. 2020-160591, filed Sep. 25, 2020, the entire contents of which are incorporated herein by reference.

FIELD

Embodiments described herein relate generally to a reading device.

BACKGROUND

Conventionally, for example, a sales data processing device such as a point of sales (POS) terminal includes a reading device that acquires a code image such as a barcode or a two-dimensional code, or an image of an appearance of a product, as information for specifying the product. The reading device incorporates an imaging unit including an image sensor or the like, and captures a code image or an image of a surface of a product through a transparent reading window provided in a part of a housing.

The conventional reading device as described above includes, in the housing, a light source (such as a light emitting diode (LED)) for illuminating, at the time of imaging, a code image or a surface of a product as a reading target. However, in a case where illumination by the light source within the housing is performed on the target through the reading window, light reflected on the inner surface of the reading window might affect the captured image. This degrades the reading performance, which is disadvantageous.

It is thus preferable to improve reading performance of the reading device by eliminating reflection of light to the inside of the reading window.

DETAILED DESCRIPTION

A reading device of an embodiment is provided to obtain information specifying a product, and the reading device includes a housing, an imaging unit, and an illumination unit. The housing includes a transparent reading window. The imaging unit is built in the housing and captures an image through the reading window. The illumination unit illuminates an imaging target of the imaging unit by surface emission of light toward an outside of the housing. The illumination unit is disposed outside an edge of the reading window and inclined with respect to the reading window such that the illumination unit protrudes from the reading window more as going further away from the reading window.

First Embodiment

Figure 1:
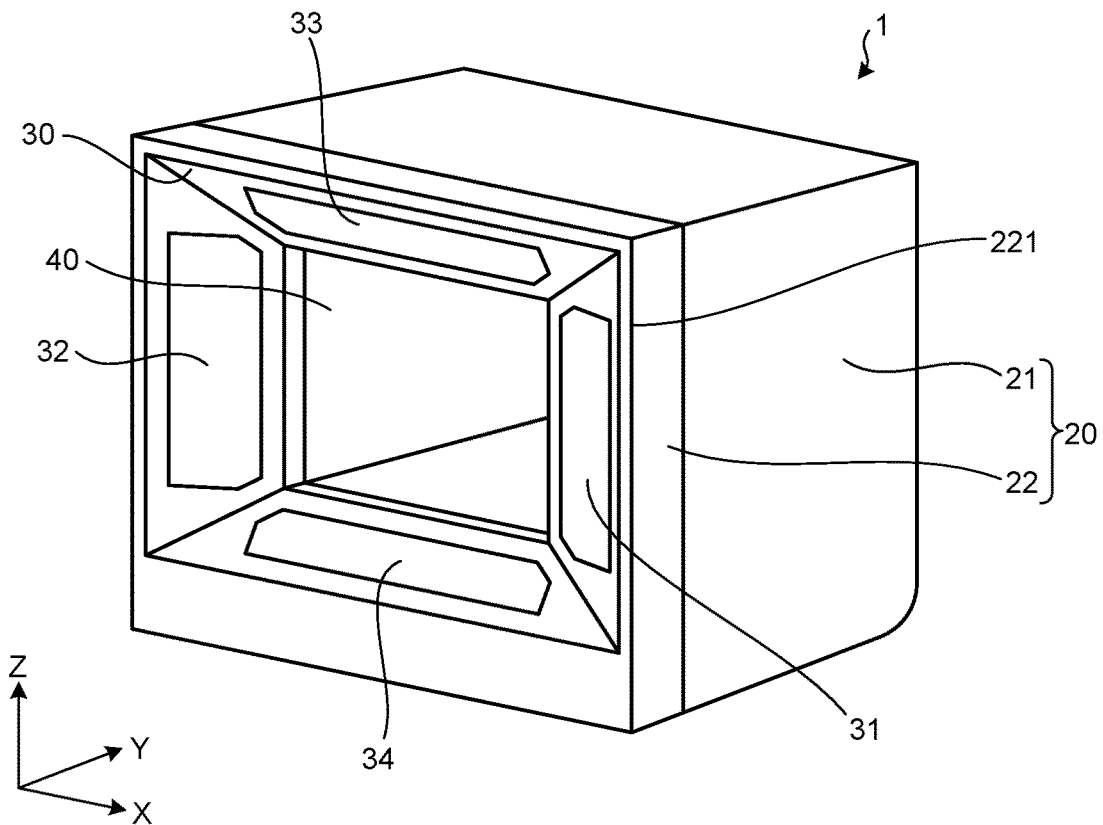
FIG. 1 is a perspective view illustrating an appearance of a reading device according to an embodiment.
Figure 2:
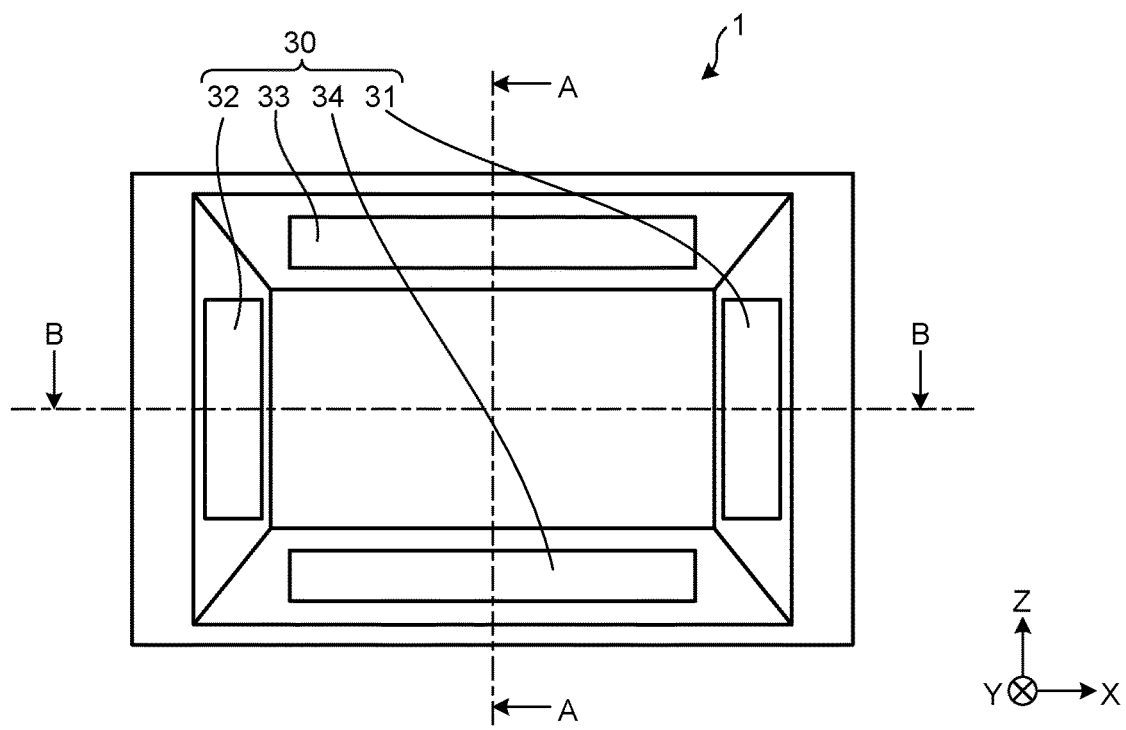
FIG. 2 is a front view of the reading device.

An embodiment will be described with reference to the drawings. FIG. 1 is a perspective view illustrating an appearance of a reading device 1 according to an embodiment. FIG. 2 is a front view of the reading device 1. For convenience of the following description, an orthogonal coordinate system indicated by an X axis, a Y axis, and a Z axis is appended to the drawing. In the drawing, a direction indicated by an arrow is a positive direction, and its opposite direction is a negative direction. The X-axis direction is a width direction of the reading device 1. The Y-axis direction is a depth direction of the reading device 1. The Z-axis direction is a height direction of the reading device 1. The standing position of the user (manipulator or operator) of the device is on the front side in the drawing.

The reading device 1 is a device used to obtain information for specifying a product. The information for specifying the product is, for example, a product code. The reading device 1 reads the information from an image obtained by capturing an image of the product code represented by a code image such as a barcode. The reading device 1 includes an imaging unit 10 (refer to FIGS. 3 and 4), a housing 20, an illumination unit 30, and the like.

The housing 20 includes a main body 21 and a cover 22. The main body 21 is a container in which one surface on the front side is an opening, and incorporates the imaging unit 10. The cover 22 closes the opening of the main body 21, and includes a transparent reading window 40 at the center. That is, the reading window 40 is provided on the front side of the reading device 1. The imaging unit 10 includes an image sensor such as a charge coupled device (CCD) or a complementary MOS (CMOS), for example, and is built in the housing 20 to capture an image through the reading window 40.

The illumination unit 30 includes four light emitting surfaces 31 to 34. While being held by the cover 22, the light emitting surfaces 31 to 34 are disposed at four positions outside the edge of the reading window 40. The light emitting surfaces 31 and 32 are provided at positions sandwiching the reading window 40 from both sides, namely, left and right sides. The light emitting surfaces 33 and 34 are provided at positions vertically sandwiching the reading window 40.

The light emitting surfaces 31 to 34 performs surface emission of light toward the outside of the housing 20 to illuminate an imaging target of the imaging unit 10. The light emitting surfaces 31 to 34 are inclined with respect to the reading window 40 so as to protrude more from the reading window 40 toward a side farther from the reading window 40. With this configuration, the light emitting surfaces 31 to 34 irradiate the obliquely front side of the reading window 40. Surface directions of the light emitting surfaces 31 to 34 (directions indicated by normals of the surfaces) are different from each other. The surface directions of the light emitting surfaces 31 to 34 intersect with each other on the front side of the reading window 40.

Figure 3:
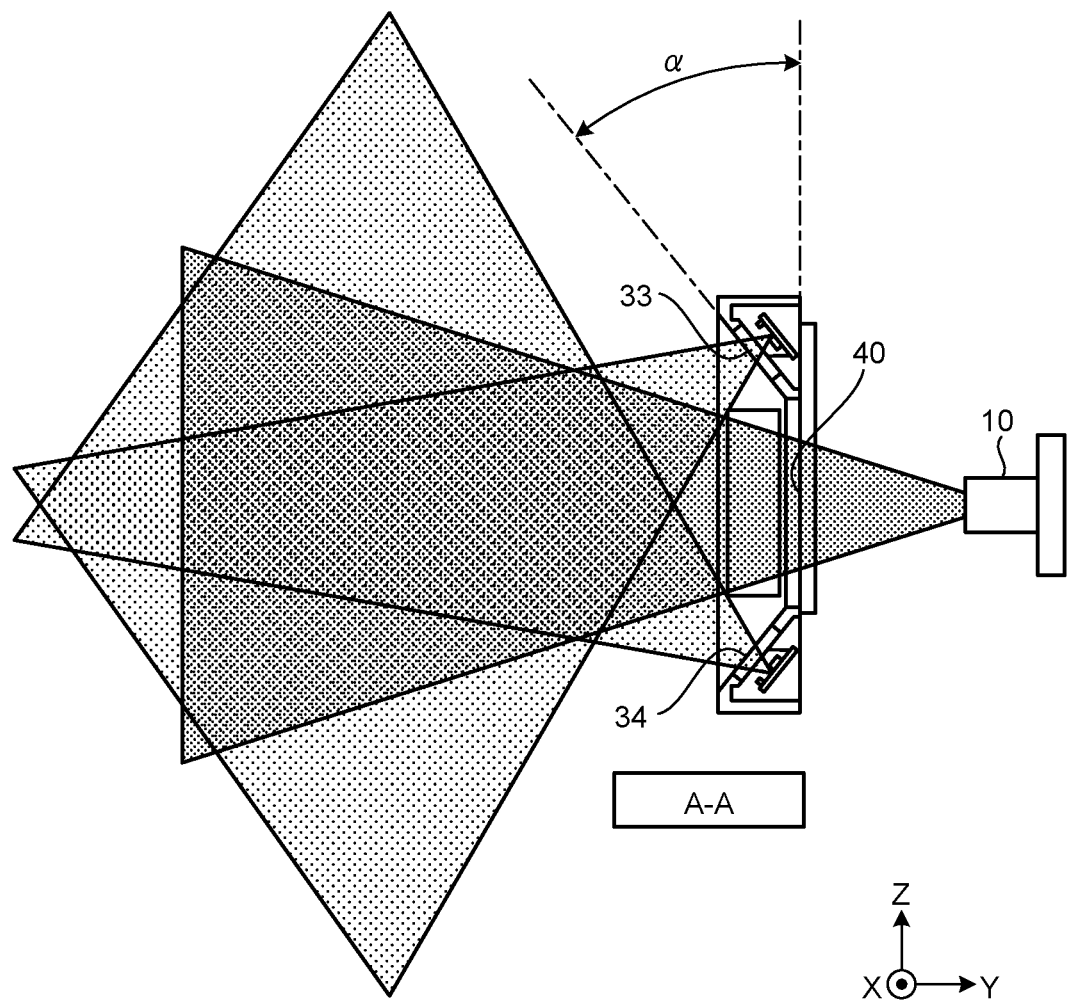
FIG. 3 is a cross-sectional view illustrating an arrival range of light beams on upper and lower light emitting surfaces of a reading window.
Figure 4:
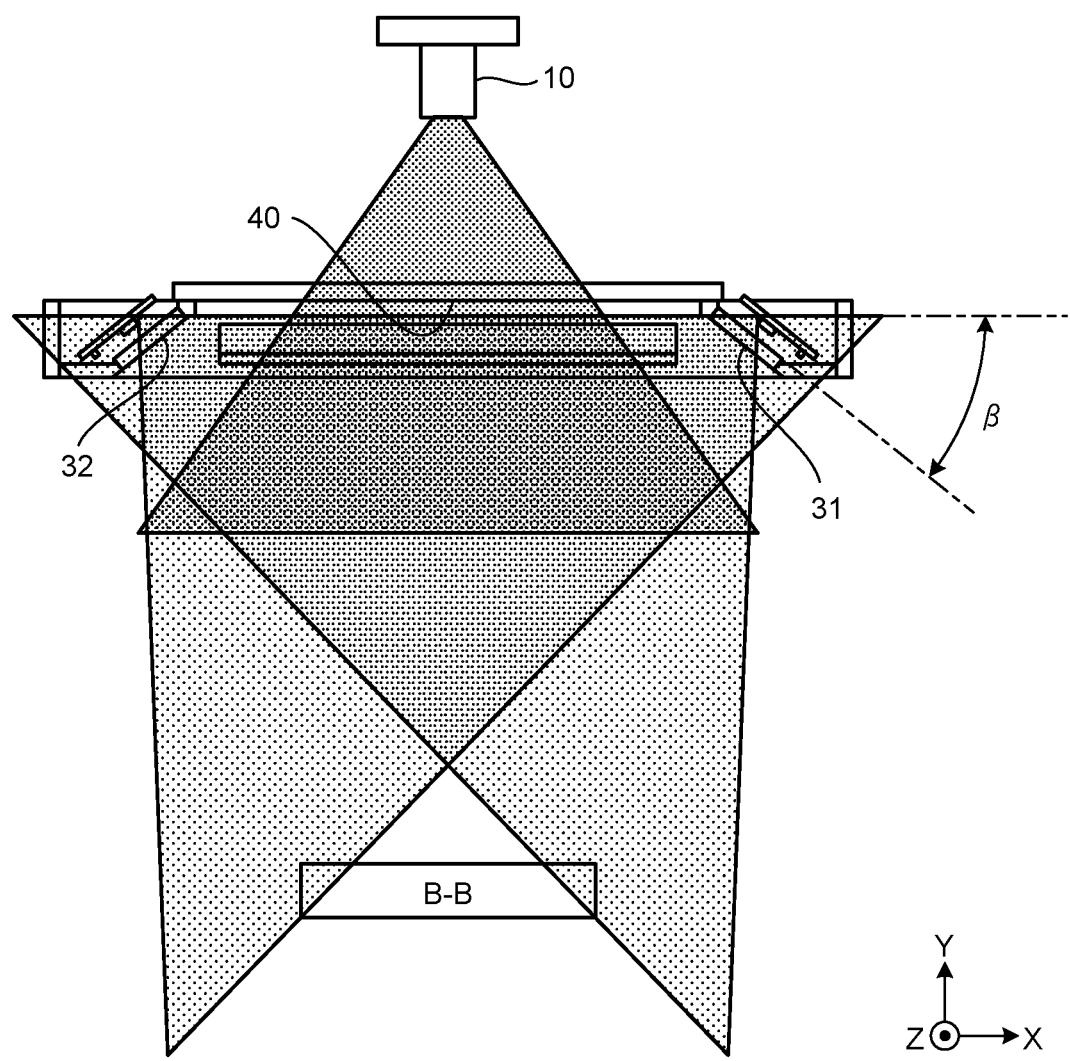
FIG. 4 is a cross-sectional view illustrating an arrival range of light beams on left and right light emitting surfaces of the reading window.

FIG. 3 is a diagram illustrating arrival ranges of light from the light emitting surfaces 33 and 34 above and below the reading window 40, illustrating a cross-sectional view at a position indicated by line A-A in FIG. 2. FIG. 4 is a diagram illustrating arrival ranges of light from the light emitting surfaces 31 and 33 on the right and left side of the reading window 40, illustrating a cross-sectional view at a position indicated by line B-B in FIG. 2. In each drawing, the arrival range of light is illustrated by halftone dots surrounded by triangles. The light emitting surfaces 33 and 34 are long-distance illumination units and illuminate a range away from the reading window 40. The light emitting surfaces 31 and 33 are near-field illumination units that illuminate a range in the neighborhood of the reading window 40. The difference in the arrival range (irradiation range) of each beam of light corresponds to a difference in the inclination angle with respect to the reading window 40, for example. Comparing an inclination angle α of the light emitting surfaces 33 and 34 with respect to the reading window 40 with an inclination angle β of the light emitting surfaces 31 and 33 with respect to the reading window 40, the angle α is set to be smaller than the angle β.

The intensity of light emitted from the light emitting surface 31 is approximately the same as the intensity of light emitted from the light emitting surface 32. Because of the long illumination distance of the light emitting surface 31, the intensity of the light emitted from the light emitting surface 33 is higher than the intensity of the light emitted from the light emitting surfaces 33 or 32. The light emitting surface 34, which emits light in the upward direction, can cause the user to feel glare when the intensity of light is too high, and thus, it is preferable to set the light emitting surface in accordance with the installation state of the reading device 1 or the like. This can allow the intensity of light emitted from the light emitting surface 34 to be set to the same level as or lower than the intensity of light emitted from the light emitting surfaces 31 or 32.

Figure 5:
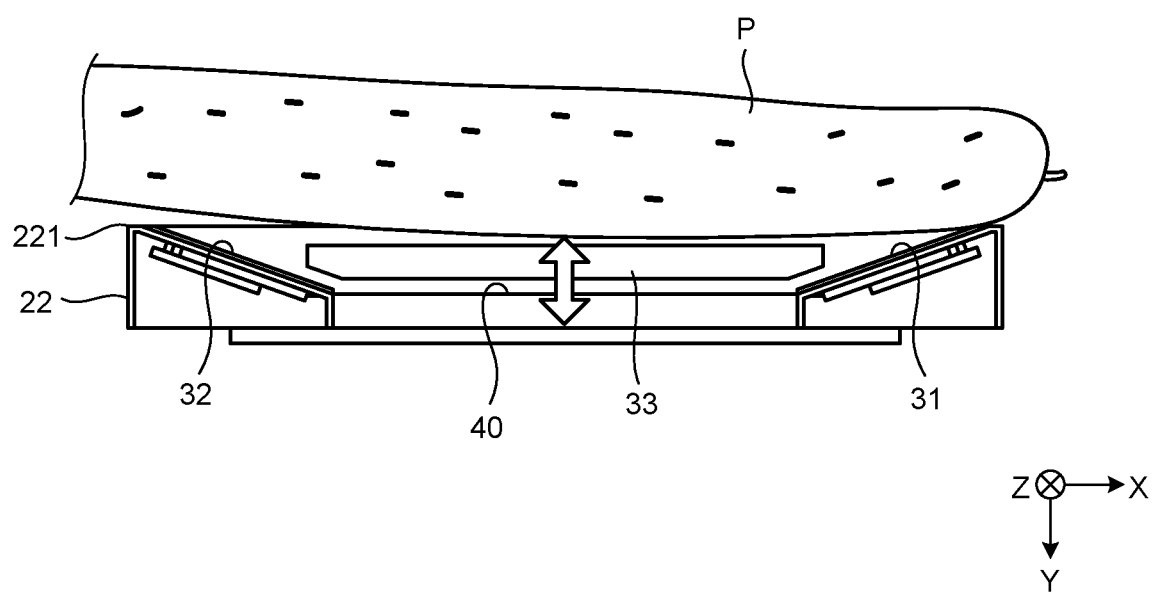
FIG. 5 is a cross-sectional view illustrating a state in which a product is brought close to the reading window.

FIG. 5 is a cross-sectional view illustrating a state in which a product P is brought close to the reading window 40. The near-field illumination units (light emitting surfaces 31 and 32) emit light for irradiating a product in the neighborhood of the reading window 40.

In a state where the product is in the neighborhood of the reading window 40, there is a shaded portion where product is not irradiated with light. Executing imaging with the imaging unit 10 in this state would affect the imaging in such a manner that the captured image has excessive shadows or unevenness. To handle this, illumination for the product in the neighborhood of the reading window 40 is applied from the left and right directions by the light emitting surfaces 31 and 32 which emit light beams of approximately the same intensity.

As also illustrated in FIG. 5, the light emitting surfaces 31 to 34 are provided to be inclined with respect to the reading window 40, and protrudes more from the reading window 40 toward a side farther from the reading window 40. With this configuration, even when the product P is brought closer to the reading window 40 than necessary, the product P is more likely to hit an outer periphery 221 of the cover 22 holding the light emitting surfaces 31 to 34, rather than hitting the reading window 40. Due to such a positional relationship and characteristics of the shape, the reading window 40 is less likely to be broken or damaged.

Figure 6:
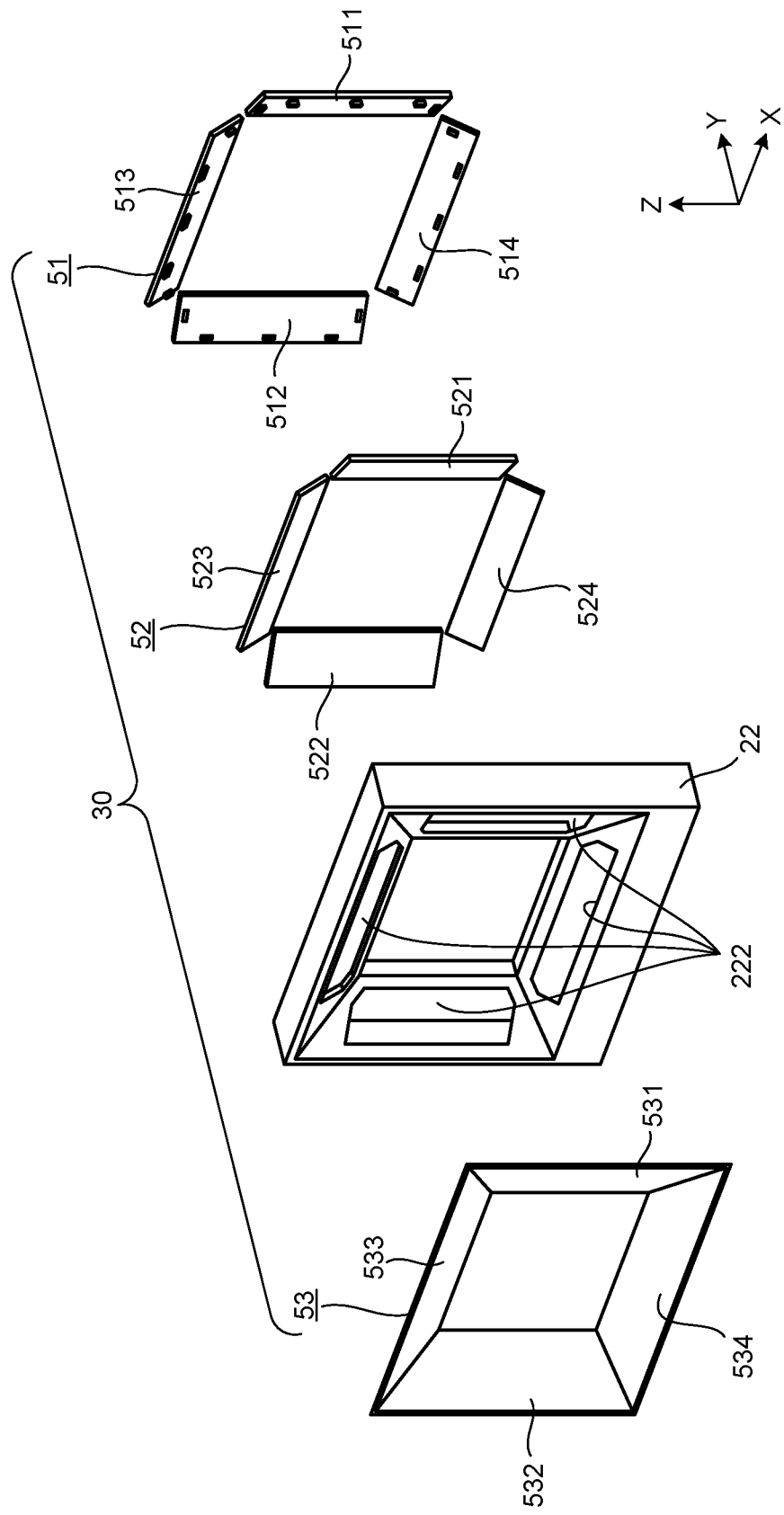
FIG. 6 is an exploded perspective view illustrating a structure around a cover.

Next, the configuration and arrangement of the light emitting surfaces 31 to 34 included in the illumination unit 30 will be described. FIG. 6 is an exploded perspective view illustrating a structure around the cover 22. The front portion of the housing 20 includes: the cover 22 which is a lid of an opening of the main body 21; and components of the illumination unit 30, namely, an LED substrate 51 (a light emitting unit), a light guide plate 52 (a light guide unit), and a diffusion plate 53 (a diffusion unit). The light guide plate 52 captures light from an edge (end surface) and performs surface emission of light. The diffusion plate 53 diffuses light captured from one surface and emits the diffused light from the other surface.

In the present embodiment, the LED substrates 51 includes four LED substrates 511 to 514. Each of the LED substrates 511 to 514 is a substrate on which a plurality of LED elements 515 (refer to FIG. 7) is mounted. In the present embodiment, the light guide plate 52 includes four light guide plates 521 to 524. Furthermore, in the present embodiment, the diffusion plate 53 includes four diffusion plates 531 to 534.

The light emitting surface 31 of the illumination unit 30 is formed with a stacked components, namely, the LED substrate 511, the light guide plate 521, and the diffusion plate 531. Similarly, the light emitting surface 32 is formed with the LED substrate 512, the light guide plate 522, and the diffusion plate 532; the light emitting surface 33 is formed with the LED substrate 513, the light guide plate 523, and the diffusion plate 533; and the light emitting surface 34 is formed with the LED substrate 514, the light guide plate 524, and the diffusion plate 534.

The order of stack, from the innermost side, is the LED substrate 51, the light guide plate 52, the cover 22, and the diffusion plate 53. The diffusion plate 53 faces the light guide plate 52 through an opening 222 of the cover 22.

Figure 7:
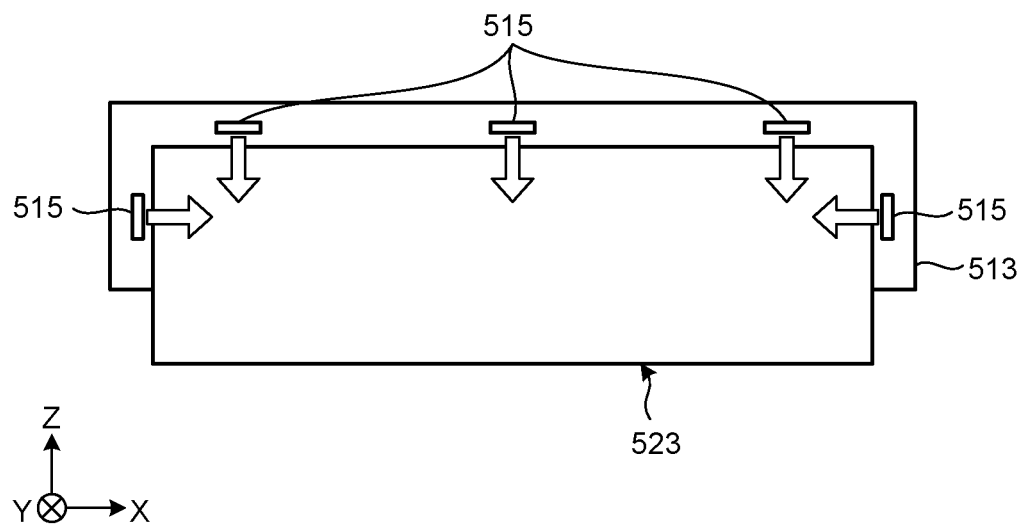
FIG. 7 is a front view illustrating a positional relationship between an LED element and a light guide plate.

FIG. 7 is a front view illustrating a positional relationship between the LED element 515 and the light guide plate 523. The light guide plate 523 captures light emitted from the LED element 515 from an edge (end surface) and performs surface emission of light. The positional relationship between the other light guide plates 521, 522, 524 and the LED elements 515 of the other LED substrates 511, 512, 514 is also similar to the relationship in the case of the light guide plate 523 of FIG. 7.

Figure 8:
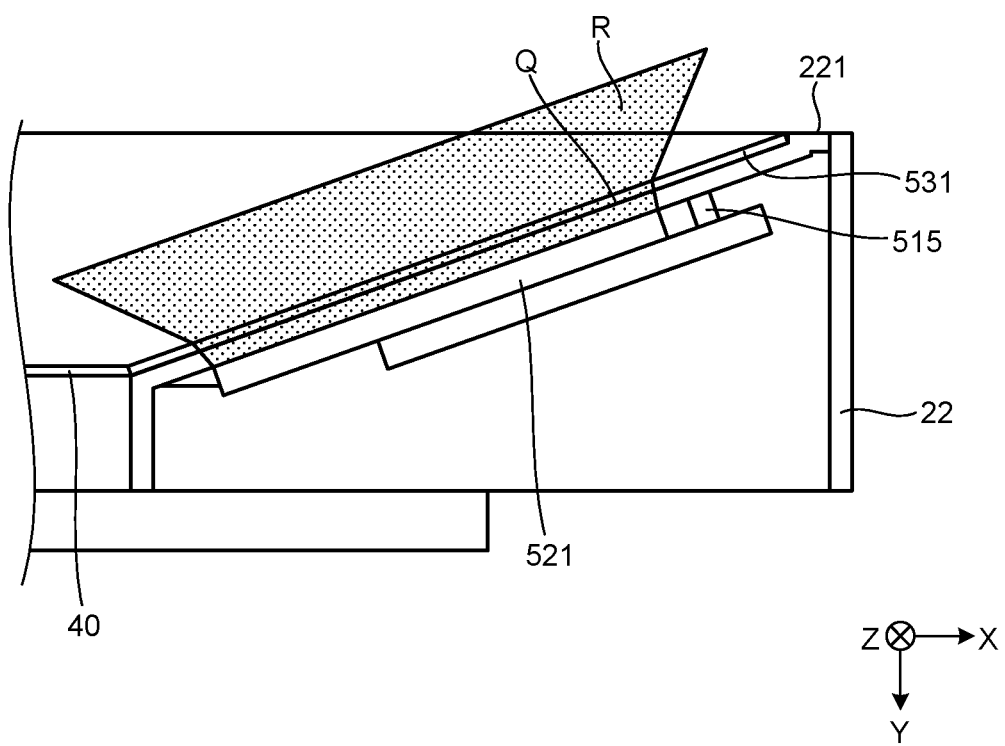
FIG. 8 is a cross-sectional view illustrating a positional relationship among the LED element, the light guide plate and a diffusion plate.

FIG. 8 is a cross-sectional view illustrating a positional relationship among the LED element 515, the light guide plate 521, and the diffusion plate 531. In the drawing, a symbol Q denotes an emission light path of the light guide plate 521, and a symbol R denotes a diffusion light path of the diffusion plate 531.

The diffusion plate 531 facing the light guide plate 521 through the opening 222 of the cover 22 captures light emitted by surface emission of the light guide plate 521 from the inner surface, and diffuses the light to be emitted from the outer surface. The positional relationship among the other diffusion plates 532 to 534, the light guide plates 522 to 524, and the LED element 515 is also similar to the relationship of the case of the diffusion plate 531 and light guide plate 521 in FIG. 8.

Note that the reading device 1 includes a control unit and a memory unit. The memory unit includes a storage device such as solid state memory (SSD) or flash memory, for example. The memory unit stores a control program, product master data, imaging conditions, and the like.

The control unit is constituted with a computer including a central processing unit (CPU), read only memory (ROM), and random access memory (RAM). The CPU controls the entire operation of the reading device 1. The ROM stores various programs such as programs used to drive the CPU and various data. The RAM stores a barcode or the like read from the image captured by the imaging unit 10. In addition, the RAM is used as a work area of the CPU, where various programs and various data stored in the ROM and the memory unit are developed. By the operation of the CPU according to a control program stored in the ROM or the memory unit and expanded in the RAM, the control unit executes various types of control processing of the reading device 1.

With the above configuration, under the illumination applied by the illumination unit 30 to illuminate a surface of the product held over the reading window 40 by the user, the reading device 1 uses the imaging unit 10 to capture an image of the surface of the product illuminated by the illumination unit 30. In addition, the reading device 1 obtains a code image attached to the surface of the product or feature data of the appearance of the product from the captured image output from the imaging unit 10, and inquires of a predetermined database about information obtained by decoding the code image or information associated with the feature data, thereby specifying the product.

Note that the operations may be divided such that the reading device 1 outputs the captured image, and a sales data processing device such as a POS terminal performs the processing from the extraction of the code image and the feature data from the captured image to the specifying processing of the product.

In the operation of the reading device 1 as described above, the near-field illumination units (light emitting surfaces 31 and 32) included in the illumination unit 30 illuminate a range in the neighborhood of the reading window 40, and the long-distance illumination units (light emitting surfaces 33 and 34) mainly illuminate a positional range slightly away from the reading window 40. With this configuration, the reading device 1 can illuminate the product in a wide range from the nearby position to the distant position from the reading window 40.

In addition, since the near-field illumination unit illuminates the product from both the left and right sides of the product, it is possible to obtain a captured image sufficient for specifying the product even in imaging in the vicinity of the reading window 40 where shadow or uneven portions are likely to appear, leading to achievement of suitable reading performance.

Incidentally, although the present embodiment also includes the light emitting surface 34 that illuminates from the lower side as the long-distance illumination unit, it is also allowable, in implementation, to provide only the light emitting surface 33 on the upper side.

Although some embodiments of the present invention have been described above, these embodiments have been presented as examples, and are not intended to limit the scope of the invention. These novel embodiments can be implemented in various other forms, and various omissions, substitutions, and alterations can be made without departing from the scope and spirit of the invention. These embodiments and their modifications are included in the scope and spirit of the invention, and are included in the invention described in the claims and the equivalent scope thereof.

What is claimed is:

1. A reading device provided to obtain information specifying a product, the reading device comprising:
    a housing including a transparent reading window on a front side;
    an imaging unit that is built in the housing and captures an image through the reading window; and
    a plurality of illumination units configured to illuminate an imaging target of the imaging unit positioned in front of the housing by surface emission of light toward an outside of the housing, each of the illumination units being disposed outside an edge of the reading window and inclined with respect to the reading window such that the illumination unit protrudes from the reading window more as going further away from the reading window, wherein
    the plurality of illumination units includes:
        two near-field illumination units disposed on left and right sides of the reading window, respectively, and configured to illuminate a first range in a neighboring region of the reading window with a first light intensity; and
        a long-distance illumination unit disposed on an upper side of the reading window and configured to illuminate a second range beyond the first range with a second light intensity greater than the first light intensity,
        an inclination angle of each of the near-field illumination units with respect to the reading window being less than an inclination angle of the long-distance illumination unit with respect to the reading window.

2. The reading device according to claim 1, wherein the plurality of illumination units further includes a long-distance illumination unit disposed on a lower side of the reading window.

3. The reading device according to claim 2, wherein the inclination angle of each of the near-field illumination units with respect to the reading window is less than an inclination angle of the long-distance illumination unit disposed on the lower side with respect to the reading window.

4. The reading device according to claim 1, wherein each of the illumination units includes: a light emitting unit that emits light; a light guide unit that captures the light emitted by the light emitting unit from an edge portion and emits the light; and a diffusion unit that is stacked on the light guide unit and diffuses the light emitted from the light guide unit.

* * * * *